United States Patent [19]
Claas

[11] Patent Number: 5,645,484
[45] Date of Patent: Jul. 8, 1997

[54] TURNING DRUM FOR SELF-PROPELLING HARVESTER THRESHER

[75] Inventor: Helmut Claas, Harsewinkel, Germany

[73] Assignee: Claas Ohg Beschraenkt Haftende Offene Handels-Gesellschaft, Harsewinkel, Germany

[21] Appl. No.: 506,397

[22] Filed: Jul. 24, 1995

[30]   Foreign Application Priority Data

Aug. 4, 1994 [DE]   Germany ........................... 44 27 578.1

[51] Int. Cl.⁶ .................................................. A01F 12/18
[52] U.S. Cl. .................. 460/62; 460/72; 460/75
[58] Field of Search .................. 460/72, 75, 76, 460/77, 62

[56]         References Cited
         U.S. PATENT DOCUMENTS 4,312,366   1/1982   De Busscher et al. .................... 460/76

FOREIGN PATENT DOCUMENTS 1817993   5/1993   U.S.S.R. ................................. 460/76
2155748   10/1985   United Kingdom ...................... 460/76

*Primary Examiner*—Terry Lee Melius
*Attorney, Agent, or Firm*—Michael J. Striker

[57]           ABSTRACT

A turning drum of self-propelling harvester thresher is arranged after a threshing mechanism and has a closed casing with a plurality of rows of ribs extending parallel to a rotary axis of the drum. The ribs are inclined by substantially 20°–40° relative to a traveling direction of the harvester thresher. Thereby, the grains which strike against the inclined ribs are deviated, and as a result their striking energy is reduced and the grain breakage is prevented.

8 Claims, 2 Drawing Sheets

TURNING DRUM FOR SELF-PROPELLING HARVESTER THRESHER

BACKGROUND OF THE INVENTION

The present invention relates to a turning drum for self-propelling harvester thresher.

More particularly, it relates to a turning drum which is located after a threshing mechanism operating in accordance with the principle of a tangential flow and before a separating and cleaning device.

Turning drums of the above mentioned general type are composed in practice of steel or steel plates and have a closed casing with a substantially star-like profile in a cross-section. As a rule, a shaft of the turning drum forms a main shaft for the drive of all threshing elements, so that they must run with constant higher rotary speed. As a result, in the event of sensitive harvesting product, when grains heat the transferring drum for the deviation purposes, the grains can be partially crushed.

In order to avoid this disadvantage, it was proposed to make at least the casing of the turning drum of a material which is substantially softer than steel for example of rubber or foamed plastic. Therefore, the corn breakage can be avoided. However, it has been shown that after long time of application, the wear is so high that in unfavorable situations more than one turning drum exchange is needed per season.

SUMMARY OF THE INVENTION

Accordingly, it is an object of the present invention to provide a turning drum of the above mentioned general type, which avoids the disadvantages of the prior art.

In particular, it is an object of the present invention to provide such a turning drum which satisfies the requirement of minimal grain breakage as well as a long service life in a satisfactory manner.

In keeping with these objects and with others which will become apparent hereinafter, one feature of the present invention resides, briefly stated, in a turning drum for a self-propelling harvester thresher located after a threshing mechanism operating in accordance with the principle of tangential flow and before a separating and cleaning device, the turning drum comprising a closed casing, and a plurality of rows of inclined ribs arranged on the closed casing.

When the turning drum is designed in accordance with the present invention, it provides the above mentioned advantages. Also, the inclined position of the ribs substantially reduces the striking energy of the grains since the movement of the grains is deviated.

In accordance with another feature of the present invention, the ribs of one row are arranged in advantageous manner at identical distances from one another. Therefore, the total product stream which is deviated by the turning drum has identical conditions.

In accordance with a further feature of the present invention, the individual ribs are inclined in the traveling direction under an angle of 20°–40°. Experiments have shown that when the ribs are inclined with this inclination, very good results are obtained.

Still a further feature of the present invention, is that in the inventive turning drum the individual ribs of one row are oppositely inclined relative to the ribs of the neighboring rows. With this construction, in addition to the prevention of grain breakage, also loosening of the product mat is provided.

The individual ribs can be welded to the casing of the drum. However, it is advantageous to provide such a construction when the ribs of each row are mounted on a support which is connectable with the casing of the turning drum. In this construction, ribs which are damaged as a result of rock impact can be exchanged.

In accordance with a further important feature of the present invention, the envelope circle of the turning drum has a diameter which is 60–80 mm greater than the diameter of the casing of the turning drum.

Finally, it is another feature of the present invention that the individual ribs are inclined relative to the perpendiculars to the axis of the turning drum. Therefore, the throwing width of the grain product from the turning drum can be influenced correspondingly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
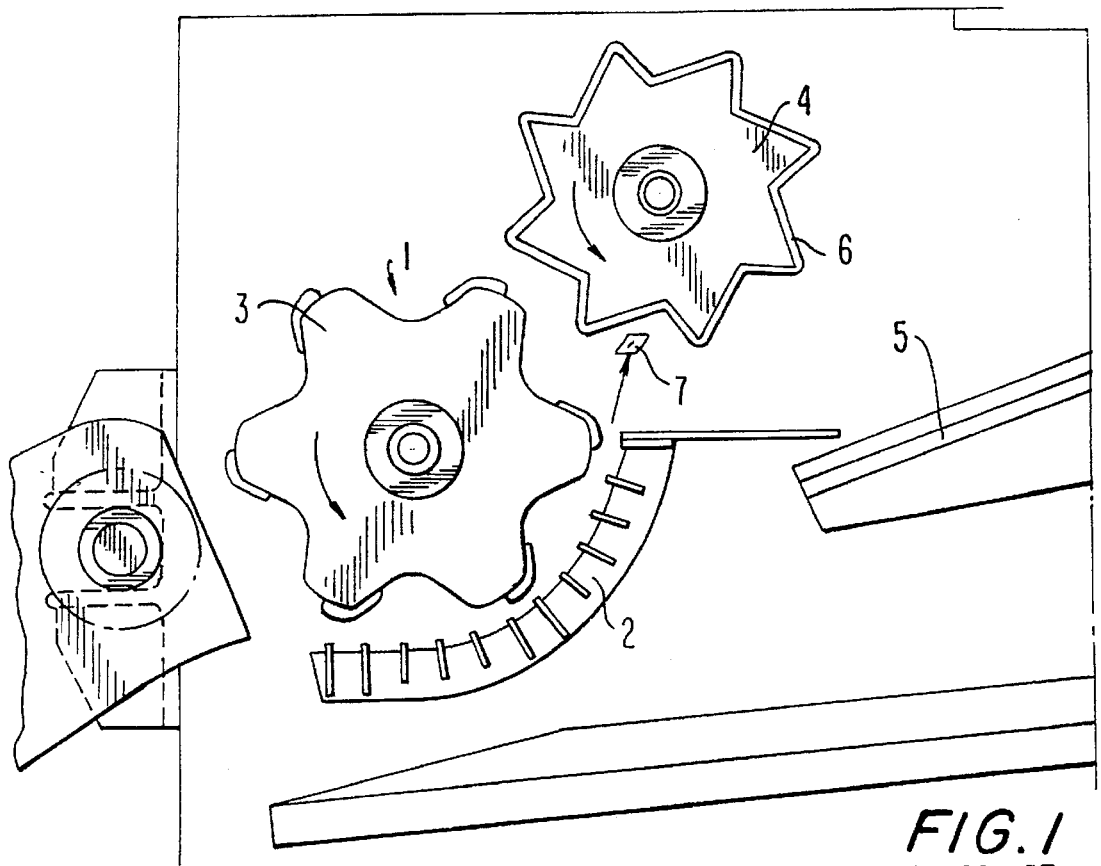
FIG. 1 is a side view of a threshing part of a harvester thresher in accordance with the prior art.
Figure 2:
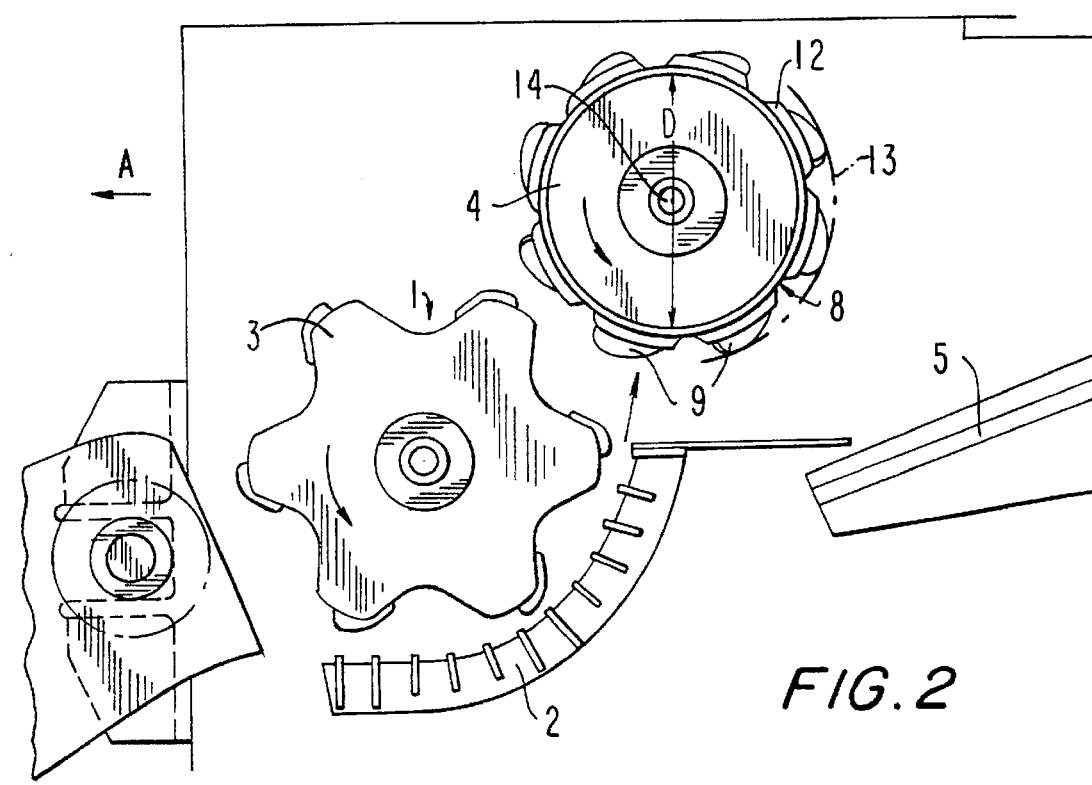
FIG. 2 is a side view of a threshing part of a harvester thresher with a turning drum in accordance with the present invention.

A threshing mechanism of a self-propelling harvester thresher is identified with reference numeral 1. It operates in accordance with the principle of a tangential flow and has a threshing basket 2 and a threshing drum 3. A turning drum 4 is arranged after the threshing mechanism. A harvesting product mat which is threshed with a greater part by the threshing mechanism 1 is deviated by the turning drum 4 to a separating device 5.

As can be seen from FIG. 1, the turning drum 4 has a substantially star-like cross-section. The turning drum 4 has a casing which is covered with a relatively thick rubber coating 6. The rubber coating 6 prevents breakage of individual grains 7 which strike the turning drum 4. It has been shown in the practice that such a coating of soft material is worn out relatively fast.

Figure 5:
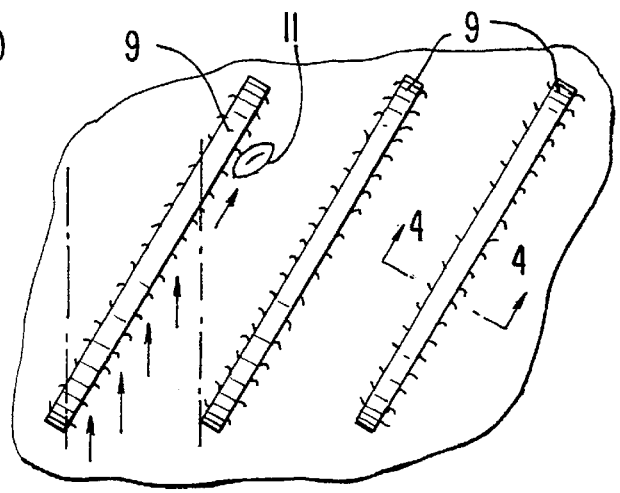
FIG. 5 is a view showing a fragment of FIG. 4 on the enlarged scale.

Taking this into consideration, the turning drum has been designed in accordance with the present invention as shown in FIGS. 2–5. As can be seen from FIG. 3, the turning drum 4 has for example a closed casing 8. The outer surface of the casing 8 is provided with a plurality of individual ribs 9 which are welded to the casing. The ribs 9 are arranged in rows 10. The ribs 9 in individual rows are located so that they are spaced from one another by identical distances. With respect to the traveling direction of the harvester thresher identified with the arrow A in FIG. 2, the ribs are offset transversely by 20°–40°. As can be seen from FIG. 4, the ribs of neighboring rows are inclined relative to one another by 30°. FIG. 5 shows how individual grains 11 are for example deviated by striking against the ribs 9 so that a greater part of their striking energy is lost.

Figure 3:
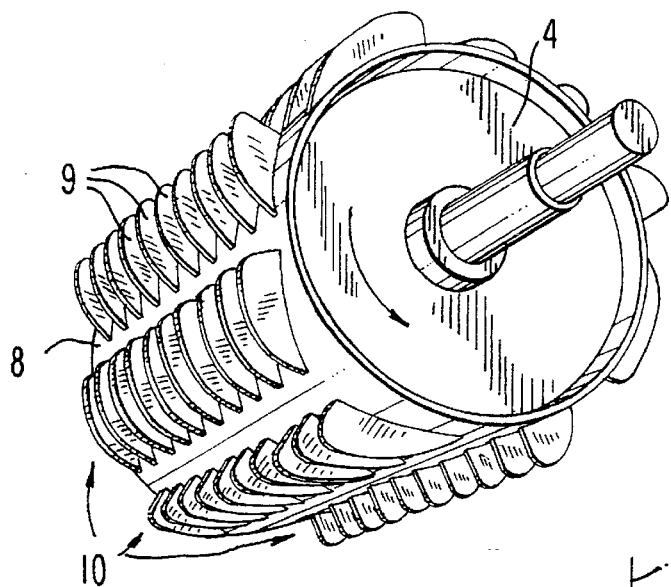
FIG. 3 is a view showing the inventive drum of FIG. 2 in perspective.
Figure 6:
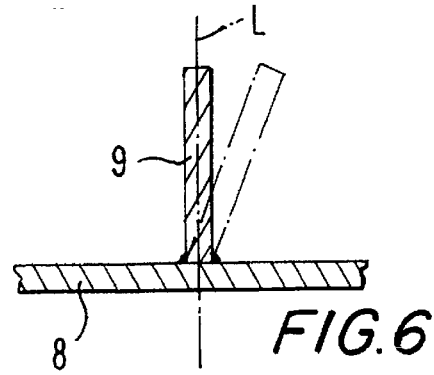
FIG. 6 is a view showing a section taken along the line VI—VI in FIG. 5.
Figure 4:
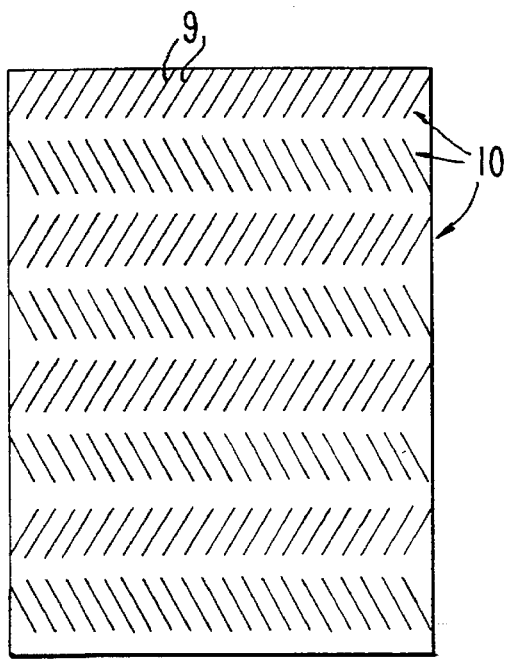
FIG. 4 is a view showing a development of a casing of the turning drum in accordance with the present invention.

In the turning drum shown in FIG. 3, the individual ribs 9 are connected with the casing 8 of the turning drum 4 by welding. In order to simplify the exchange of ribs after their damage, all ribs 9 of one row 10 can be connected with a support 12. The supports 12 can be mounted on the casing 8 of the turning drum 4 for example by not shown screw connections.

Reference numeral 13 identifies an enveloping circle of the turning drum or more particularly of the ribs. In accordance with the present invention, the diameter of the enveloping circle is approximately 60–80 mm greater than the diameter of the casing of the drum.

It will be understood that each of the elements described above, or two or more together, may also find a useful application in other types of constructions differing from the types described above.

While the invention has been illustrated and described as embodied in a turning drum for self-propelling harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A turning drum for arranging in a self-propelling harvester thresher after a threshing mechanism operating in accordance with the principle of a tangential flow and before a separating and cleaning device, the turning drum comprising a closed casing; and a plurality of rows of ribs arranged on said casing, said ribs inclined so as to deviate a moving speed and a travelling direction of grains and to reduce striking energy of said grains moving from said threshing mechanism to said separating and cleaning device.

2. A turning drum for arranging in a self-propelling harvester thresher after a threshing mechanism operating in accordance with the principle of a tangential flow and before a separating and cleaning device, the turning drum comprising a closed casing having an outer surface and an axis of rotation; and a plurality of rows of inclined ribs arranged on casing, said ribs being arranged on said outer surface of said casing, said rows of ribs extending parallel to said axis of rotation of said casing, said ribs being arranged in each row at equal distances from one another, said ribs being inclined so as to deviate a moving speed and travelling direction of grains and to reduce striking energy of said grains moving from said threshing mechanism to said separating and cleaning device.

3. A turning drum as defined in claim 2, wherein said ribs in one of said rows are inclined in an opposite direction relative to said ribs of a neighboring one of said rows.

4. A turning drum as defined in claim 2; and further comprising a plurality of supports connected with said casing, said ribs of each of said rows being mounted on a respective one of said supports.

5. A turning drum as defined in claim 2, wherein said ribs have an enveloping circle with a diameter which is 60–80 mm greater than a diameter of said casing.

6. A turning drum as defined in claim 2, wherein said casing has an axis of rotation, said ribs being inclined to perpendiculars to said axis.

7. A turning drum for arranging in a self-propelling harvester thresher after a threshing mechanism operating in accordance with the principle of a tangential flow and before a separating and cleaning device, the turning drum comprising a closed casing having an outer surface and an axis of rotation; and a plurality of rows of inclined ribs arranged on said casing, said ribs being arranged on said outer surface of said casing, said rows of ribs extending parallel to said axis of rotation of said casing, said ribs being arranged in each row at equal distances from one another, said ribs being inclined relative to a travelling direction of said drum, said ribs being inclined so as to deviate a moving speed and travelling direction of grains and to reduce striking energy of said grains moving from said threshing mechanism to said separating and cleaning device.

8. A turning drum as defined in claim 7, wherein said ribs are inclined relative to the traveling direction by 20°–40°.

* * * * *